(12) United States Patent
Lake et al.

(10) Patent No.: US 7,098,925 B1
(45) Date of Patent: Aug. 29, 2006

(54) SHADING OF IMAGES USING TEXTURE

(75) Inventors: Adam T. Lake, Beaverton, OR (US); Michael D. Rosenzweig, Beaverton, OR (US); Mark J. Harris, Beaverton, OR (US); Jason E. Plumb, Portland, OR (US); Carl S. Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/523,398

(22) Filed: Mar. 10, 2000

(51) Int. Cl.
*G09G 5/00* (2006.01)
(52) U.S. Cl. ..................... 345/584; 345/426
(58) Field of Classification Search ............... 345/582, 345/583, 584, 585, 586, 587, 592, 589, 629, 345/646, 419, 426, 473, 422, 420, 423, 421, 345/427, 552, 551, 797, 474, 475, 416; 382/302; 463/31, 32
See application file for complete search history.

(56) References Cited

U.S. PATENT DOCUMENTS

| | | | |
|---|---|---|---|
| 4,600,919 A | | 7/1986 | Stern |
| 5,124,914 A | | 6/1992 | Grangeat |
| 5,163,126 A | | 11/1992 | Einkauf et al. |
| 5,490,240 A | * | 2/1996 | Foran et al. ............... 345/587 |
| 5,659,672 A | * | 8/1997 | Yutaka et al. ............. 345/582 |
| 5,731,819 A | | 3/1998 | Gagne et al. |
| 5,742,292 A | * | 4/1998 | Murata ..................... 345/426 |
| 5,764,228 A | * | 6/1998 | Baldwin ................... 345/797 |
| 5,856,829 A | * | 1/1999 | Gray, III et al. ........... 345/422 |
| 5,870,097 A | * | 2/1999 | Snyder et al. ............. 345/426 |
| 5,905,503 A | * | 5/1999 | Penna ....................... 345/426 |
| 5,966,133 A | * | 10/1999 | Hoppe ....................... 345/420 |
| 6,037,949 A | * | 3/2000 | DeRose et al. ............ 345/582 |
| 6,057,850 A | * | 5/2000 | Kichury .................... 345/584 |
| 6,057,859 A | | 5/2000 | Handelman et al. |
| 6,064,393 A | * | 5/2000 | Lengyel et al. ........... 345/473 |
| 6,078,332 A | * | 6/2000 | Ohazama .................. 345/426 |
| 6,163,319 A | * | 12/2000 | Peercy et al. .............. 345/426 |
| 6,208,347 B1 | * | 3/2001 | Migdal et al. ............. 345/419 |
| 6,226,005 B1 | * | 5/2001 | Laferriere ................. 345/426 |
| 6,252,608 B1 | * | 6/2001 | Snyder et al. ............. 345/473 |
| 6,313,846 B1 | * | 11/2001 | Fenney et al. ............. 345/552 |
| 6,320,578 B1 | * | 11/2001 | Shiitani et al. ............ 345/419 |
| 6,337,880 B1 | | 1/2002 | Cornog et al. |
| 6,339,430 B1 | * | 1/2002 | Takeshita .................. 345/592 |
| 6,388,670 B1 | | 5/2002 | Naka et al. |
| 6,771,264 B1 | * | 8/2004 | Duluk et al. .............. 345/584 |

OTHER PUBLICATIONS

Lewis "Pose Space Deformation: A Unified Approach to Shape Interpolation and Skeleton-Driven Deformation" Centropolis, New Orleans, LA, 165-172.

Lasseter "Principles of Traditional Animation Applied to 3D Computer Animation" Pixar, San Rafael, California, 1987.

(Continued)

*Primary Examiner*—Matthew Luu
(74) *Attorney, Agent, or Firm*—Fish & Richardson P.C.

(57) ABSTRACT

Colors are obtained and used to shade two-dimensional non-photo realistic images of three-dimensional models. The colors are stored as texels in texture maps. The texels are chosen to shade the images based on their orientation in a scene. The colors may be obtained once, in a pre-rendering process. The colors may then be selected in a run-time process.

25 Claims, 6 Drawing Sheets

OTHER PUBLICATIONS

Thomas (Contributor) et al., "The Illusion of Life: Disney Animation" 47-51.

Hoppe, "Progressive Meshes" Microsoft Research, 99-108, http://www.research.microsft.com/research/graphics/hoppe/.

Popovic et al., "Progressive Simplicial Complexes" Microsoft Research, http://www.research.microsft.com/~hoppe/.

Hoppe "Efficient Implementation of progressive meshes" Coput. & Graphics vol. 22, No. 1, pp. 27-36, 1998.

Taubin et al., "Progressive Forest Spilt Compression" IBM T.J. Watson Research Center, Yorktown Heights, NY.

Cohen-Or et al., "Progressive Compression of Arbitrary Triangular Meshes" Computer Science Department, School of Mathematical Sciences, Tel Aviv, Israel.

Bajaj et al., "Progressive Compression and Transmission of Arbitrary Triangular Meshes" Department of Computer Sciences, University of Texas at Austin, Austin, TX.

Pajarola et al., "Compressed Progressive Meshes" Graphics, Visualization & Usability Center, College of Computing, Georgia Institute of Technology, Jan. 1999.

Alliez et al., "Progressive Compression for Lossless Transmission of Triangle Meshes" University of Southern California, Los Angeles, CA, 195-202.

Chow "Optimized Geometry Compression for Real-time Rendering" Massachusetts Institute of Technology, Proceedings Visualization 1997, Oct. 19-24, 1997, Phoenix, AZ, 347-354.

Markosian "Real-Time Nonphotorealistic Rendering" Brown University site of the NSF Science and Technology Center for Computer Graphics and Scientific Visualization, Providence, RI.

Elber Line Art Rendering via a Coverage of Isoperimetric Curves, IEEE Transactions on Visualization and Computer Graphics, vol. 1, Department of Computer Science, Technion, Israel Institute of Technology, Haifa, Israel, Sep. 1995.

Zeleznik et al., "SKETCH: An Interface for Sketching 3D Scenes" Brown University site of the NSF Science and Technology Center for Computer Graphics and Scientific Visualization, 1996.

Landsdown et al., "Expressive Rendering: A Review of Nonphotorealistic Techniques" IEEE Computer graphics and Applications, 29-37, 1995.

Raskar "Image Precision Silhouette Edges" University of North Carolina at Chapel Hill, Microsoft Research, 1999 Symposium on Interactive 3D Graphics Atlanta, GA, 135-231, 1999.

Ma et al., "Extracting Feature Lines for 3D Unstructured Grids" Institute for Computer Applications in Science and Engineering (ICASE), NASA Langley Research Center, Hampton, VA, IEEE, 1997.

Samet "Applications of spatial data structures: computer graphics, image processing, and GIS" University of Maryland, Addison-Wesley Publishing Company, 1060-1064, Reading, MA, Jun. 1990.

Dyn "A Butterfly Subdivision Scheme for Surface Interpolation with Tension Control" ACM Transactions on Graphics, vol. 9, No. 2, Apr. 1990.

Zorin "Interpolation Subdivision for Meshes With Arbitrary Topology" Department of Computer Science, California Institute of Technology, Pasadena, CA.

Lee "Navigating through Triangle Meshes Implemented as linear Quadtrees" Computer Science Department, Center for Automation Research, Institute for Advanced Computer Studies, University of Maryland College Park, MD, Apr. 1998.

Grooch et al., "Interactive Technical Illustration," Proceedings 1999 Symposium on Interactive 3D Graphics, Apr. 26-28, 1999, pp 31-38 and p 220.

Heidrich et al., "Realistic, Hardware-Accelerated Shading and Lighting," Computer Graphics Proceedings, Annual Conference Series, 1999, pp 171-178.

\* cited by examiner

SHADING OF IMAGES USING TEXTURE

BACKGROUND

This invention relates to shading an image generated from a three-dimensional ("3D") model.

Shading is the application of color tones and/or textures across an image. Shading provides visual sensations of light, depth, and texture to rendered images.

Traditional animation techniques involve drawing two-dimensional ("2D") images on cells, often by hand. Each time a new perspective of the image is required, an entirely new image is drawn on a new cell.

Recently, computer programs have been used to render 2D images using 3D objects. How these images are shaded as they are rendered affects the look of the images.

DESCRIPTION OF THE DRAWINGS

Like reference symbols in the various drawings indicate like elements.

DETAILED DESCRIPTION

The following embodiments render shaded 2D non-photo realistic ("NPR") images from data for 3D models. NPR images are cartoon-like images that appear flat, rather than 3D. The NPR effect is achieved by shading the images using 3D data from the 3D model.

Figure 1:
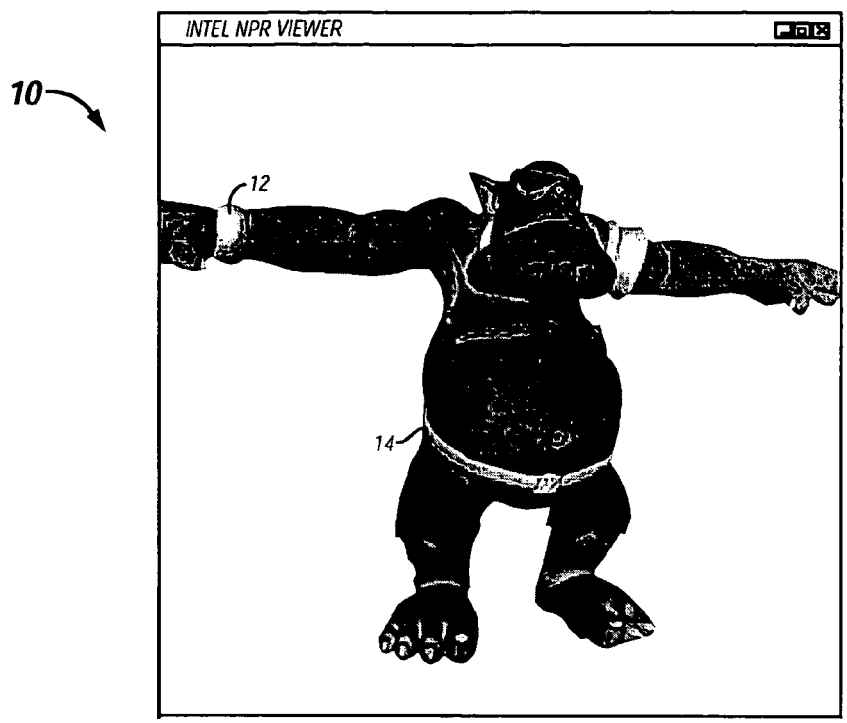
FIG. 1 is a view of a 3D model.
Figure 2:
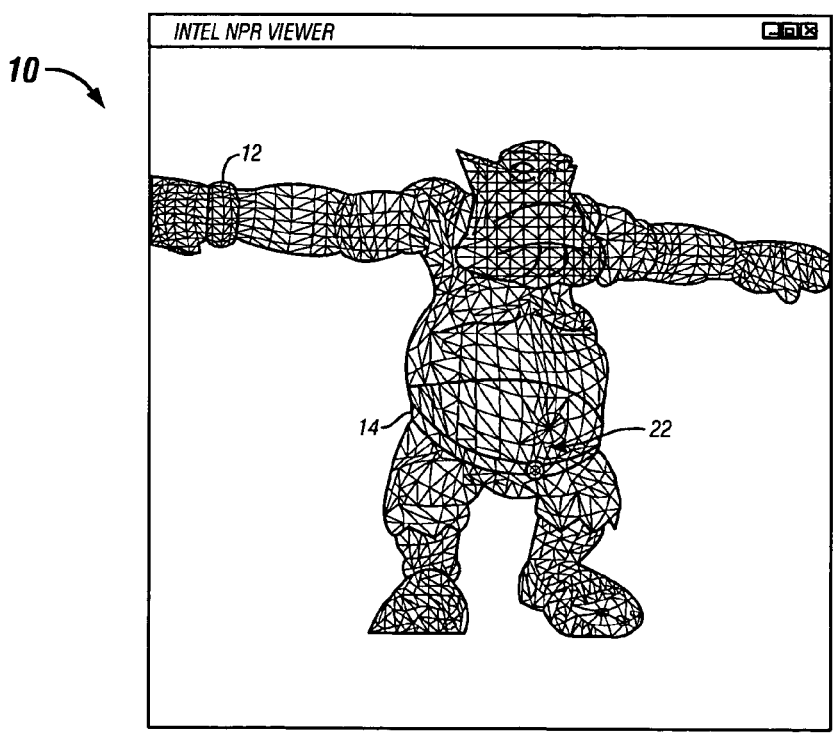
FIG. 2 is a view showing polygons in the 3D model.

A 3D model 10 (FIG. 1) is comprised of interconnecting polygons 22 (FIG. 2). Polygons 22 are triangles in this embodiment; however, other types of polygons may be used. Groups of polygons are organized into meshes, each of which corresponds to an element (such as a material, e.g. skin, hair, bone, clothing, etc.) of the 3D model. For example, armband 12 and belt 14 each correspond to a different mesh in 3D model 10.

Figure 3:
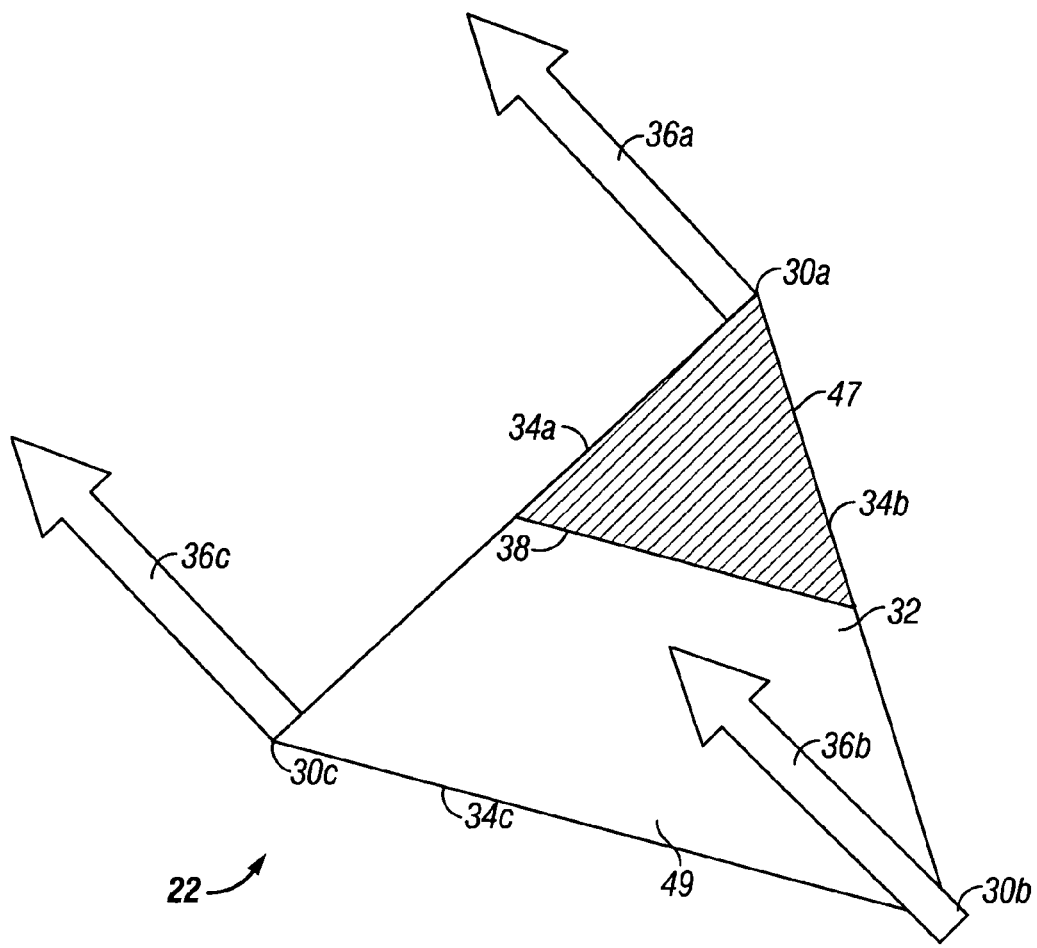
FIG. 3 is a close up view of a polygon.

In FIG. 3, the 3D data defining each triangular polygon 22 in model 10 includes coordinates for vertices 30a, 30b and 30c in xyz (or other) space. These vertices define a face 32 and edges 34a, 34b and 34c for each polygon. The 3D data associated with each vertex may also include image-shading information, such as the color or gray level at the vertex and an area surrounding the vertex.

A normal vector ("normal") 36a, 36b and 36c at each respective vertex 30a, 30b and 30c affects how this image is perceived relative to a predefined reference point (the "eye point") in the "virtual world" that the 3D model 10 inhabits. The normal determines the amount of light that reaches a vertex from a virtual light source (not shown) in the virtual world. Coordinates for the normals may be stored with the 3D data for each vertex. Alternatively, a normal may be computed at "run-time" during rendering of the image.

Figure 4:
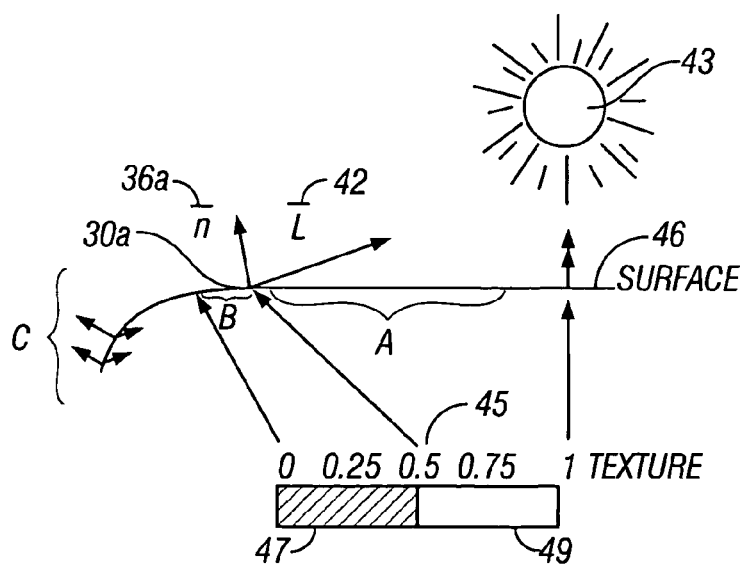
FIG. 4 is a side view of a surface of the 3D model.

Referring to FIG. 4, a vertex 30a of polygon 22 and virtual light source 43 define a normalized light vector 42.

The dot product of light vector 42 and corresponding vertex 30a is used to determine the amount of light that face 32 of polygon 22 receives from virtual light source 43. Specifically, the dot product defines the angle between light source 43 and normal 36a. This angle determines the amount of light and, thus the texture (such as shading) that may be applied to face 32 when polygon 22 is rendered as a 2D NPR image. So, when the direction of normal 36a is changed relative to light source 43, the shading of face 32 on polygon 22 may also change.

FIG. 4 shows two textures, here colors 47 and 49, for shading the surface 46 of a mesh of model 10. These two colors 47 and 49 are stored as texels in a texture map (not shown). Texels are representations of particular colors shown on displays (not shown). Texture maps are used to store texels so that they may be accessed and applied to faces 32 of polygons 22. Color 49 will be selected to shade face 32 of polygon 22 if the dot product of vector 42 and normal 36a is greater than threshold value 45, here 0.5. If the dot product is less than threshold value 45, but greater than 0, color 47 will be selected to shade face 32 of polygon 22. In this embodiment, all polygons 22 in region A, or the illuminated region, will be shaded with color 49 in the corresponding 2D, NPR image of polygon 22. All polygons in region B, or the shaded region, will be shaded with color 47 in the corresponding 2D, NPR image of polygon 22. All polygons in region C will not be shaded for they fall on a portion of the 3D model that will not be rendered in the corresponding 2D, NPR image of polygon 22.

If vertices 30a, 30b or 30c lay in different regions A, B or C, then polygon 22 will be shaded by interpolating a hardedge 38 between the vertices of polygon 22 during texture mapping (see below). Here, hardedge 38 separates colors 47 and 49 in a rendered 2D NPR image of polygon 22. Hardedge 38 may be created during (604) of FIG. 6 and may also be seen in FIG. 7.

Figure 5:
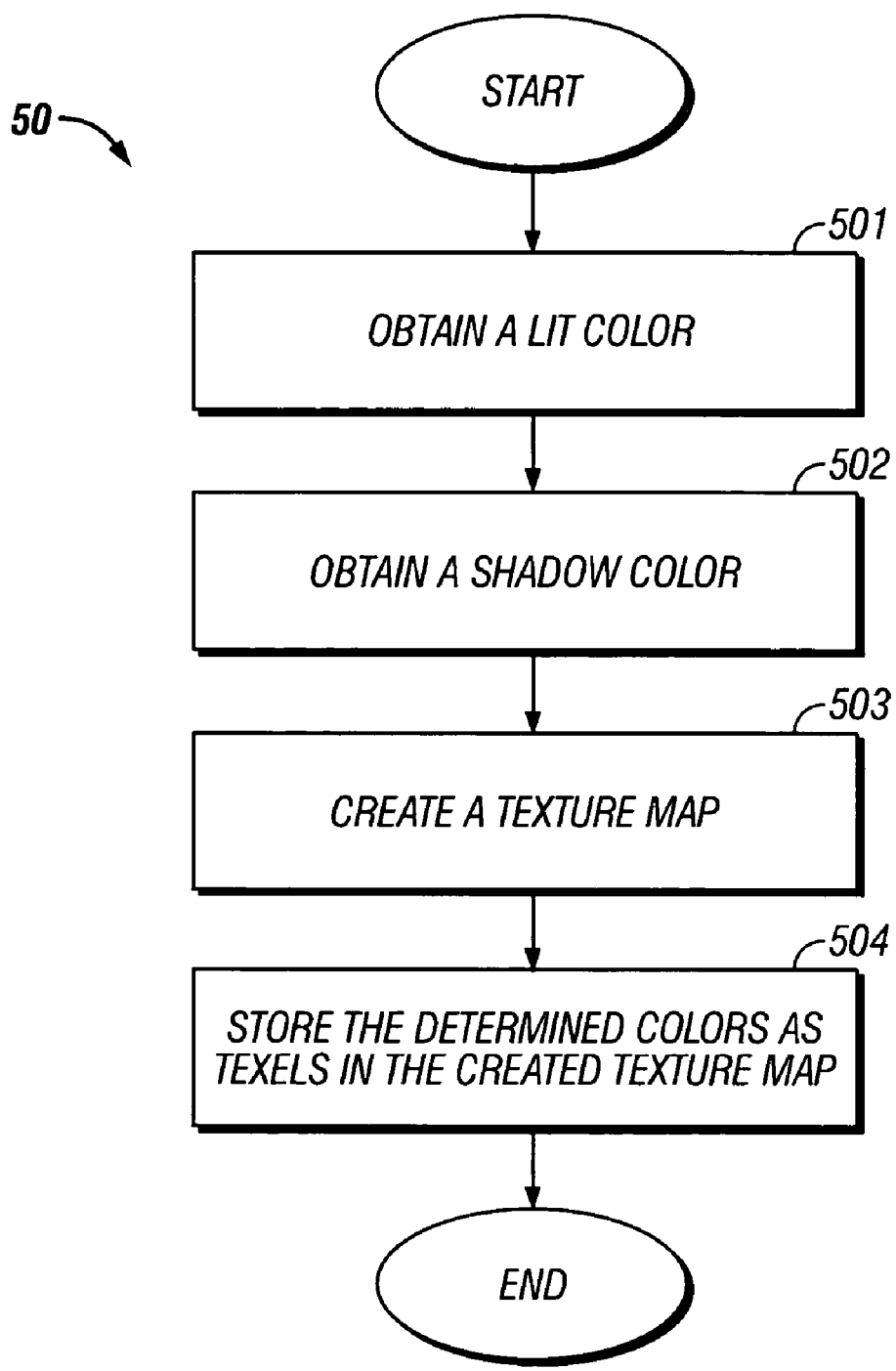
FIG. 5 is a flow diagram of a process according to an embodiment of the invention.
Figure 6:
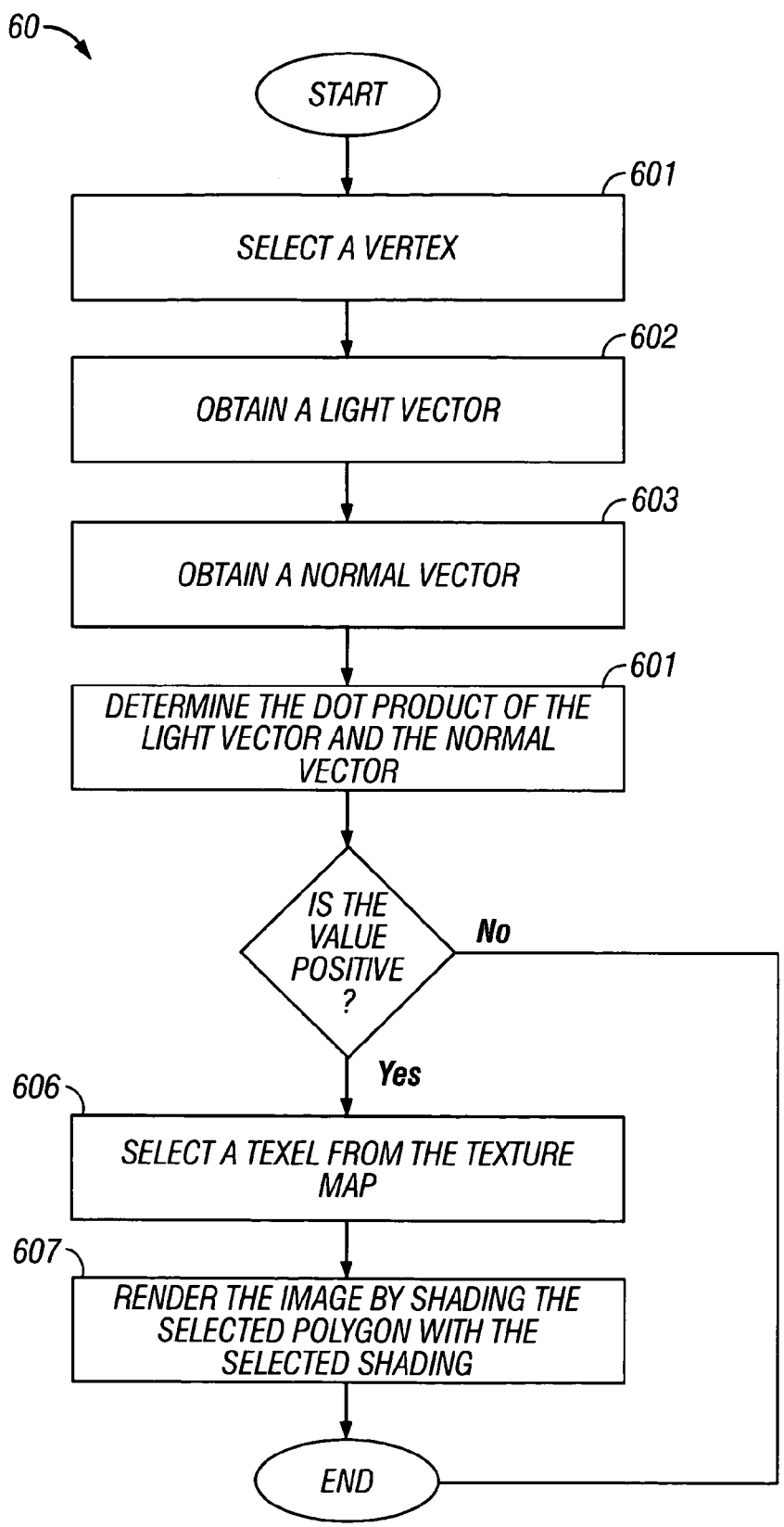
FIG. 6 is a flow diagram of a process according to an embodiment of the invention.
Figure 7:
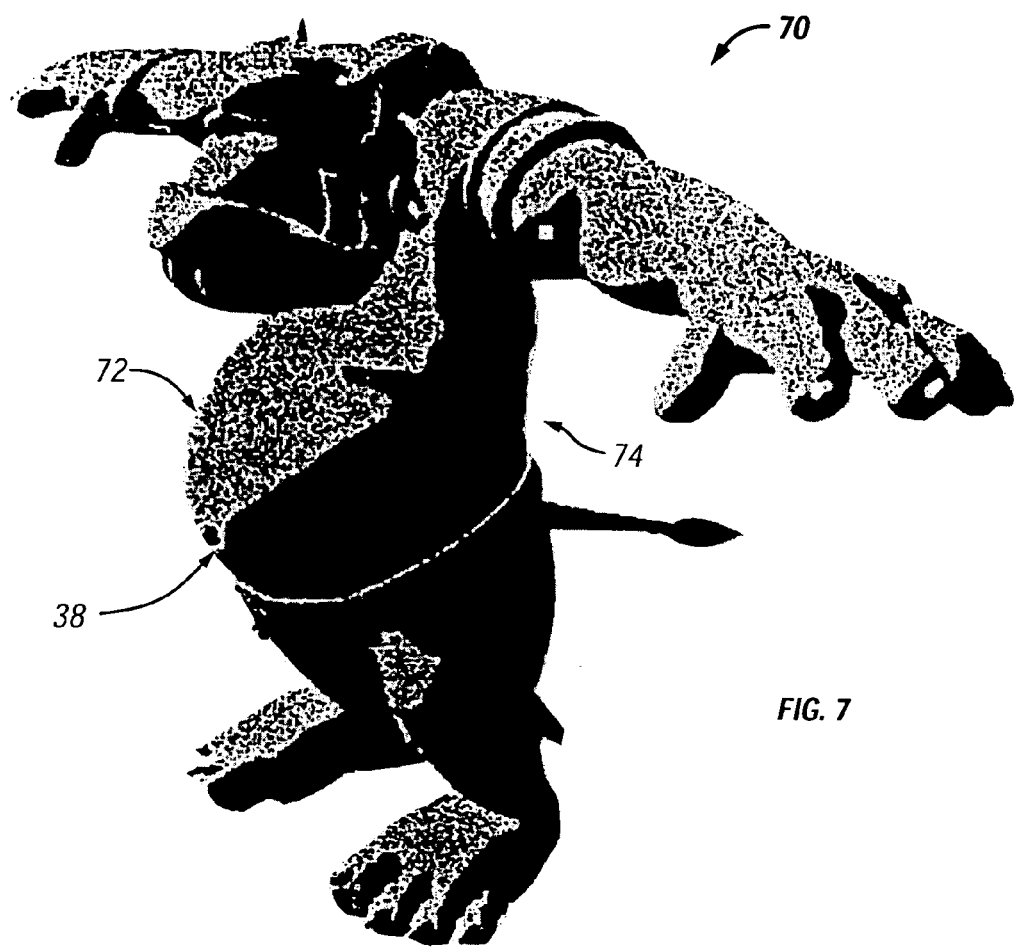
FIG. 7 is a view of an image of the 3D model rendered using two colors.

FIGS. 5 and 6 show processes 50 and 60 for shading 2D images created from 3D models using colors stored as texels in a texture map. Process 50 determines texels (e.g., colors) in a texture map for shading model 10 in a scene. As shown in FIG. 7, a 2D NPR image 70 of a view of 3D model 10 may be shaded with two colors, a lit color 72 (e.g. illuminated) and a shadowed color 74, for each mesh (or materials) shown in the model.

Process 50, obtains (501) the lit color 72 for each mesh (i.e. material) of model 10. Lit color 72 may be obtained by using a set of virtual lighting parameters.

For example, a material's lit color can be determined by summing the products of three lighting parameters. The parameters may be a global ambient light coefficient ("$a_g$") multiplied by a material ambient light coefficient ("$a_m$"), a light source ambient light coefficient ("$a_l$") multiplied by a material ambient light coefficient ("$a_m$") and a light source diffuse light coefficient ("$d_l$") multiplied by a material diffuse light coefficient ("$d_m$"). The sum of these three products is retained as the material's lit color, namely $C_i$. $C_i$ may also be defined as $C_i = a_g * a_m + a_l * a_m + d_l * d_m$, wherein $a_g$ indicates the overall lighting of a scene in which an image is to be rendered; am indicates the amount of light reflected by a material to be rendered; $a_l$, indicates the strength of light reflected by the material to be rendered; $d_l$, indicates the intensity of a virtual light source present in the scene to be rendered, and dm indicates the strength of a virtual light source present in the scene to be rendered. The $C_i$ calculation may be done for each mesh in the 2D NPR image to be rendered.

Process 50 also obtains (502) shadow color 74, or in alternate embodiments, shadow colors, for each mesh in model 10. Shadow color 74 is obtained by processing the lit color 72 with a shadow factor. The shadow factor may be a parameter provided to, or selected by, the user that is used to darken, lighten, or change the texture, style or even color of lit color 72. For example, lit color 72 may be multiplied by the shadow factor to obtain shadow color 74. However, any of a number on operations, including a user-selected color substitution, may be performed to obtain shadow color 74.

Process 50 creates (503) a texture map for storing (504) each determined lit color and shadow color for each mesh of 3D model 10. The texture map may be a one-dimensional texture map with two texels, one for the lit color and one for the shadow color. This texture map is typically computed once per mesh of 3D model 10 in a "pre-rendering" process and stored prior to rendering the image (a pre-rendering process occurring at a time prior to actually rendering the image). The texture map may be configured to store several (e.g., "n") texels representing various graphical effects, shades or colors, including non-linear textures, desired for a particular mesh of model 10. The texture map may be further designed to use particular texture functionality provided by specific 3D graphic processors.

Referring to FIG. 6, process 60 selects the possible colors for shading an image 70 (FIG. 7) of 3D model 10 based on the orientation of the model in a scene. Process 60 may be used to shade the image of 3D model 10 using a texture map with two or more texels during a "run-time" process rendering the image (a run-time process occurring at the time of actually rendering the image).

Process 60 selects (601) a polygon vertex 30(*a*) (FIG. 4) to determine the appropriate shading for a face 32 (FIG. 3) of a polygon 22 on an image. Process 60 obtains (602) light vector 42 (FIG. 4) for the selected vertex 30*a*. Coordinates for light vector 42 may be obtained by referencing previously stored information or by determining it in a "run-time" process. Process 60 obtains (603) normal 36*a* to surface 46 of 3D Model 10. Data for normal 36*a* may also be stored with the 3D data for the vertex. Alternatively, the normal may be computed at "run-time" during rendering of the image.

Process 60 determines the dot product (604) of light vector 42 and normal 36*a* to obtain a texture coordinate for vertex 30*a*. If the determined texture coordinate (604) is a positive number, process 60 selects (606) a texel from a texture map. If the texture coordinate is a negative number, the selected polygon 22 is not viewable and process 60 will not select a texel. If the texture coordinate of vertices 30*a*, 30*b* or 30*c* of polygon 22 differ (604) may create a hardedge 38 dividing the shading and/or rendering of polygon 22. Process 60 renders (607) the 2D NPR image of 3D-Model 10 using the selected texel to shade the face 32 of the selected polygon 22.

The texture coordinate is compared to a threshold value 45 (FIG. 4) to select (606) a texel from a texture map. For a two-color texture map, a texture coordinate above the threshold value 45 selects the texel representing a lit color 49 and a texture coordinate below the threshold value 45 selects a texel representing a shadow color. In alternative embodiments, any combination of indexing a texture map may be used including ranges of threshold values and/or actual "color values" (a color value being a numeric value associated with a particular color). Such indexing of the texture map may allow more flexibility in the selection of texels using process 60.

Processes 50 and 60 may be used to create animation cels for cartooning. For example, a 3D model, such as model 10, may be generated, and then positioned in a desired manner in a scene. Processes 50 and 60 may be executed on the model to produce a 2D image for that position. Then, the 3D model 10 can be re-positioned (e.g., rotated), and process 60 executed on the re-positioned model to produce a 2D image for the new position. This process may be repeated to produce NPR images for any number of positions. In this way, processes 50 and 60 can generate animation cels automatically.

Processes 50 and 60 are performed in 3D space, meaning that they are performed using 3D data. By processing data in 3D space (as opposed to 2D space), processes 50 and 60 can be performed using a processor and rendering can be done using graphics accelerator cards of a personal computer.

Figure 8:
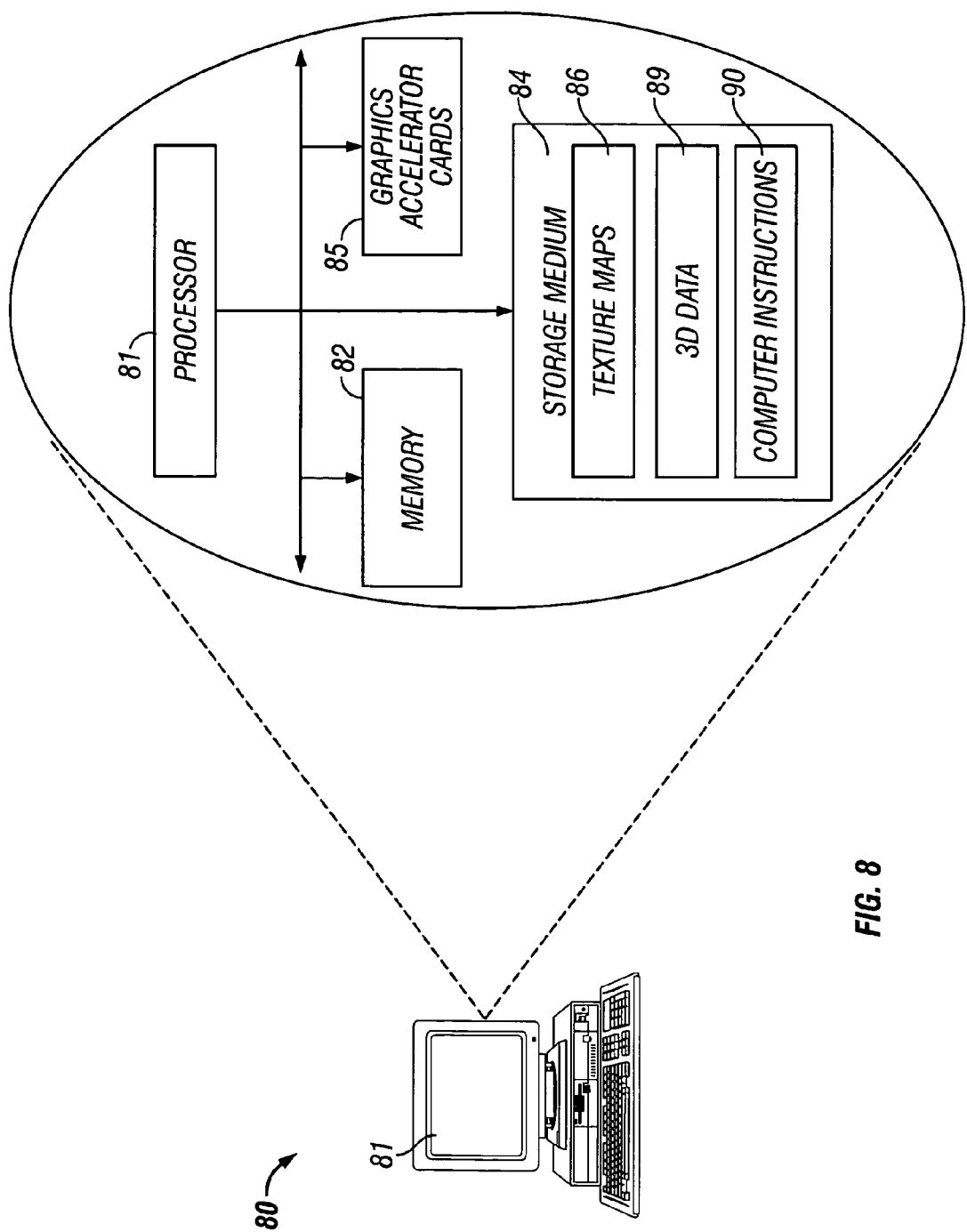
FIG. 8 is a view of computer hardware used to implement one embodiment of the invention.

FIG. 8 shows a computer 80 for rendering NPR images using processes 50 and 60. Computer 80 includes a processor 81, a memory 82, a storage medium 84 (e.g., a hard disk), and a 3D graphics accelerator card 85 for repositioning a 3D model and manipulating 3D data. Storage medium 84 stores texture maps 86 containing the texels described above, 3D data 89, and computer instructions 90 for rendering 2D images via processes 50 and 60. In a preferred embodiment, the invention allows for the images to be rendered using graphic accelerator cards 85 with the lighting functions disabled and the one-dimensional texture maps enabled.

Processes 50 and 60, however, are not limited to use with any particular hardware or software configuration; they may find applicability in any computing or processing environment. Processes 50 and 60 may be implemented in hardware, software, or a combination of the two. Processes 30 and 60 may be implemented in computer programs executing on programmable computers that each include a processor, a storage medium readable by the processor (including volatile and non-volatile memory and/or storage elements), at least one input device, and one or more output devices. Program code may be applied to data entered using an input device to perform processes 50 and 60 and to generate output information. The output information may be applied to one or more output devices, such as display screen 81.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 50 and 60. Processes 50 and 60 may also be implemented as a computer-readable storage medium, configured with a computer program, where, upon execution, instructions in the computer program cause the computer to operate in accordance with processes 50 and 60.

A number of embodiments of the invention have been described. Nevertheless, it will be understood that various modifications may be made without departing from the spirit and scope of the invention. For example, more colors may be obtained and stored as texels in a texture map. These additional colors may be selected by providing several threshold values between which particular colors are selected from an assortment of colors. The texture maps may further contain many more colors or tones of colors for shading each material found in model 10. Additionally, lit color 72 may be selected by a program or by the user from a range of colors or textures available. Accordingly, other embodiments are within the scope of the following claims.

What is claimed is:

1. A method of shading an image to produce a cartoon image based on a three-dimensional model organized as a plurality of polygons, each polygon defined by a set of vertices, the method comprising:
    providing a texture map having a plurality of texels, each texel having a color value that is determined using a set of virtual lighting parameters;
    assigning a range of texture coordinates to each texel in the texture map;
    obtaining a texture coordinate for a vertex of a polygon based on a dot product of a surface normal to the vertex and a light vector between the vertex and a virtual light source, wherein obtaining a texture coordinate comprises interpolating values in texture space;
    selecting one of the texels from the texture map by determining the range in which the texture coordinate for the vertex of the polygon lies; and
    rendering the cartoon image, wherein rendering comprises rendering the polygon using the selected texel.

2. The method of claim 1, wherein one of the plurality of texels has a color value that represents an illuminated color for the image.

3. The method of claim 2, further comprising:
    processing the color value representing the illuminated color with a shadow factor to obtain a color value that represents a shadow color for the image.

4. The method of claim 3, further comprising storing the color value that represents the shadow color as a texel in the texture map.

5. The method of claim 1, wherein the image comprises representations of a plurality of materials, each material having a texture map.

6. An article comprising a machine-readable medium that stores instructions for use in rendering a cartoon image based on a three-dimensional model organized as a plurality of polygons, each polygon defined by a set of vertices, the instructions for causing a machine to:
    provide a texture map having two or more texels, each texel having a color value that is determined using a set of virtual lighting parameters;
    assign a range of texture coordinates to each texel in the texture map;
    obtain a texture coordinate for a vertex of a polygon based on a dot product of a surface normal to the vertex and a light vector between the vertex and a virtual light source, wherein obtaining a texture coordinate comprises interpolating values in texture space;
    select one of the texels from the texture map by determining the range in which the texture coordinate for the vertex of the polygon lies; and
    render the cartoon image, wherein rendering comprises rendering the polygon using the selected texel.

7. The article of claim 6, wherein one of the plurality of texels has a color value that represents an illuminated color for the image.

8. The article of claim 7 further comprising instructions for causing the machine to:
    process the color value representing the illuminated color with a shadow factor to obtain a color value that represents a shadow color for the image.

9. The article of claim 8, further comprising instructions for causing the machine to store the color value that represents the shadow color as a texel in the texture map.

10. The article of claim 6, wherein the image comprises representations of a plurality of materials, each material having a texture map.

11. An apparatus for use in rendering a cartoon image based on a three-dimensional model organized as a plurality of polygons, each polygon defined by a set of vertices, comprising:
    a memory which stores instructions; and
    a processor that executes the instructions to:
        (i) provide a texture map having two or more texels, each texel having a color value that is determined using a set of virtual lighting parameters;
        (ii) assign a range of texture coordinates to each texel in the texture map;
        (iii) obtain a texture coordinate for a vertex of a polygon based on a dot product of a surface normal to the vertex and a light vector between the vertex and a virtual light source, wherein obtaining a texture coordinate comprises interpolating values in texture space;
        (iv) select one of the texels from the texture map by determining the range in which the texture coordinate for the vertex of the polygon lies; and
        (v) render the cartoon image, wherein rendering comprises rendering the polygon using the selected texel.

12. The apparatus of claim 11 wherein one of the plurality of texels has a color value that represents an illuminated color for the image.

13. The apparatus of claim 11, wherein the processor executes instructions to:
    process the color value representing the illuminated color with a shadow factor to obtain a color value that represents a shadow color for the image.

14. The apparatus of claim 13, wherein the processor executes instructions to store the color value that represents the shadow color as a texel in the texture map.

15. The apparatus of claim 11, wherein the image comprises representations of a plurality of materials, each material having a texture map.

16. The method of claim 1, wherein determining the color values for the plurality of texels is performed as a pre-rendering process and selecting is performed as a run-time process.

17. The article of claim 6, further comprising instructions to:
    determine the color values for two or more texels for the texture map in a pre-rendering process; and
    select the one of the texels from the texture map in a run-time process.

18. The apparatus of claim 11, wherein the processor executes instructions to:
    determine the color values for two or more texels for the texture map in a pre-rendering process; and
    select the one of the texels from the texture map in a run-time process.

19. The method of claim 1, further comprising:
    interpolating a hardedge between vertices of the polygon if the texture coordinate for the vertex of the polygon differs from a second texture coordinate for a second vertex of the polygon.

20. The method of claim 1, wherein the polygon is a triangle defined by three vertices.

21. The method of claim 1, wherein the polygon is not shaded it the texture coordinate is a negative number.

22. The article of claim 6, further comprising instructions for causing the machine to interpolate a hardedge between vertices of the polygon if the texture coordinate for the vertex of the polygon differs from a second texture coordinate for a second vertex of the polygon.

23. The apparatus of claim 11 wherein the processor executes instructions to interpolate a hardedge between vertices of the polygon if the texture coordinate for the vertex of the polygon differs from a second texture coordinate for a second vertex of the polygon.

24. The method of claim 1, wherein the texture, map consists essentially of two texels, each texel representing a color value.

25. The method of claim 1, wherein the texture map consists essentially of a limited amount of texels such that the limited amount of texels are sufficient to create the appearance of a cartoon image.

* * * * *